(12) United States Patent
Le Gallo et al.

(10) Patent No.: US 6,817,804 B2
(45) Date of Patent: Nov. 16, 2004

(54) DOOR PANEL ASSEMBLY

(75) Inventors: Yann Le Gallo, Orleans (FR); Pascal De Vries, Sandillion (FR); Klaus Bruno Wilhelm Blume, Nauheim (DE); Charles Berry Hopson, Lebanon, TN (US); Herve Laurandel, Herouville-St. Clair (FR); Simon Blair Dobson, Kent (GB); Damien Cabanne, Fontainebleau (FR); Mark Graham Lawrie, Lion en Sulias (FR)

(73) Assignee: Meritor Light Vehicle Systems-France, Sully-sur-Loire (FR)

( * ) Notice: Subject to any disclaimer, the term of this patent is extended or adjusted under 35 U.S.C. 154(b) by 7 days.

(21) Appl. No.: 10/068,473

(22) Filed: Feb. 6, 2002

(65) Prior Publication Data
US 2002/0110412 A1 Aug. 15, 2002

(30) Foreign Application Priority Data
Feb. 7, 2001 (GB) .............................................. 0102987

(51) Int. Cl.⁷ ................................................. B60J 5/04
(52) U.S. Cl. ...................................... 403/408.1; 49/502
(58) Field of Search ......................... 403/408.1; 49/348, 49/375, 502

(56) References Cited

U.S. PATENT DOCUMENTS

| | | | | |
|---|---|---|---|---|
| 1,986,981 A | * | 1/1935 | Ross ................... | 403/408.1 X |
| 4,191,060 A | | 3/1980 | Sessa | |
| 4,503,732 A | | 3/1985 | Schust | |
| 4,848,032 A | * | 7/1989 | Ballor et al. .............. | 49/375 X |
| 4,964,238 A | | 10/1990 | Nishijima et al. | |
| 4,970,911 A | | 11/1990 | Ujihara et al. | |
| 4,995,568 A | | 2/1991 | Yamagishi et al. | |
| 5,199,310 A | | 4/1993 | Yoshimura | |
| 5,375,375 A | | 12/1994 | Lee | |
| 5,425,206 A | | 6/1995 | Compeau et al. | |
| 5,469,656 A | | 11/1995 | Gier et al. | |
| 5,502,926 A | * | 4/1996 | Grace et al. ................... | 49/375 |
| 5,505,022 A | | 4/1996 | Shibata et al. | |
| 5,622,005 A | * | 4/1997 | Ochenski et al. .............. | 49/375 |
| 5,624,150 A | * | 4/1997 | Venier ....................... | 49/502 X |

(List continued on next page.)

FOREIGN PATENT DOCUMENTS

| | | | |
|---|---|---|---|
| DE | 196 19 087 A1 | 11/1997 | |
| DE | 197 55 899 A1 | 6/1999 | |
| EP | 0 451 019 A1 | 10/1991 | |
| EP | 0 663 535 A1 | 7/1995 | |
| EP | 0 811 516 A2 | 12/1997 | |
| EP | 0 892 724 B1 | 1/1999 | |
| EP | 2001199236 | 7/2001 | |
| GB | 597795 | 2/1948 | |
| GB | 1154293 A  * | 6/1969 | ........... F16B/35/04 |
| GB | 1386078 A  * | 3/1975 | ........... F16D/65/40 |
| GB | 2 222 847 A | 3/1990 | |
| WO | WO 99/60280 A1 | 11/1999 | |

OTHER PUBLICATIONS

Search Report conducted May 22, 2001, GB 0102987.5.

*Primary Examiner*—Daniel P. Stodola
*Assistant Examiner*—Ryan M. Flandro
(74) *Attorney, Agent, or Firm*—Carlson, Gaskey & Olds

(57) ABSTRACT

An assembly including a first, second and third component and a first and second fixing member, the first, second and third component having respective first, second and third holes, the first hole being a threaded hole, in which the first fixing member cooperates with the second hole and a first threaded portion of the first fixing member engaging the first hole to secure the first component to the second component, the first and second fixing member cooperating with the third hole with the first fixing member engaging the second fixing member to secure the third component to the first component, in which the first component is situated between the second and third component.

22 Claims, 2 Drawing Sheets

U.S. PATENT DOCUMENTS

| | | | |
|---|---|---|---|
| 5,647,171 A | * 7/1997 | Wirsing et al. | 49/502 |
| 5,694,717 A | 12/1997 | Gier | |
| 5,749,174 A | 5/1998 | Mariel | |
| 5,778,599 A | * 7/1998 | Saito | 49/375 |
| 5,778,600 A | 7/1998 | Chu | |
| 5,966,872 A | * 10/1999 | Wasek et al. | 49/375 |
| 6,053,653 A | * 4/2000 | Tanaka et al. | 403/408.1 X |
| 6,125,526 A | * 10/2000 | Wierzchon | |
| 6,126,355 A | * 10/2000 | Clover, Jr. | 403/408.1 X |
| 6,152,646 A | 11/2000 | Muller-Blech et al. | |
| 6,183,038 B1 | 2/2001 | Hansen et al. | |
| 6,185,872 B1 | 2/2001 | Seeberger et al. | |
| 6,397,524 B1 | 6/2002 | Sakaguchi et al. | |
| 6,427,386 B1 | 8/2002 | Kalb et al. | |
| 6,634,142 B2 | 10/2003 | Dobson et al. | |
| 2001/0034975 A1 | * 11/2001 | Dobson et al. | 49/348 X |
| 2002/0040554 A1 | * 4/2002 | Blume et al. | 49/502 |
| 2002/0100220 A1 | * 8/2002 | Lawrie et al. | 49/502 |

* cited by examiner

DOOR PANEL ASSEMBLY

This application claims priority to United Kingdom (GB) Patent Application Number 0102987.5 filed on 7 Feb. 2001.

BACKGROUND OF THE INVENTION

The present invention relates to door panel assemblies for automotive vehicles such as cars.

Vehicles typically have doors with windows. It is possible to lower and raise a window glass in order to open and close the window. The vertical position of the window glass is controlled by a window regulator mechanism, parts of which are generally secured to a lower edge of the window glass.

The window glass and the window regulator mechanism are positioned in a cavity within the door and are attached a wet side, of a door panel. The window regulator mechanism is driven by a window regulator drive system, which is attached to the other side, a dry side of the panel opposite. The window regulator drive system is in driving co-operation with components of the window regulator mechanism. The window regulator drive system can comprise a manual arrangement or a powered motor arrangement.

A problem with known door panel assemblies is to ensure alignment of the window regulator mechanism with the window regulator drive system.

An object of the present invention is to provide an improved form of aligning a first, second, and third component of this assembly. The invention is particularly applicable to aligning a window regulator mechanism (a second component) with a window regulator drive system (a third component) when these components are formed as an assembly with a door panel (a first component). It should be noted that the invention is, however, applicable to other assemblies where alignment of components is required.

Another object of the present invention is to provide an assembly which permits the easy removal of the window regulator drive mechanism from the assembly.

SUMMARY OF THE INVENTION

Thus, according to the present inventions there is provided an assembly including a first, second and third component and a first and a second fixing member. The first, second and third component have respective first, second and third holes;, The first hole is a threaded hole, in which the first fixing member cooperates with the second hole. A first threaded portion of the first fixing member engages the first hole to secure the first component to the second component. The first and/or second fixing member cooperate with the third hole with the first fixing member engaging the second fixing member to secure the third component to the first component. The first component is situated between the second and third component.

BRIEF DESCRIPTION OF THE DRAWINGS

The invention will now be described by way of example only, with reference to the accompanying drawings.

DETAILED DESCRIPTION OF THE PREFERRED EMBODIMENT

Figure 1:
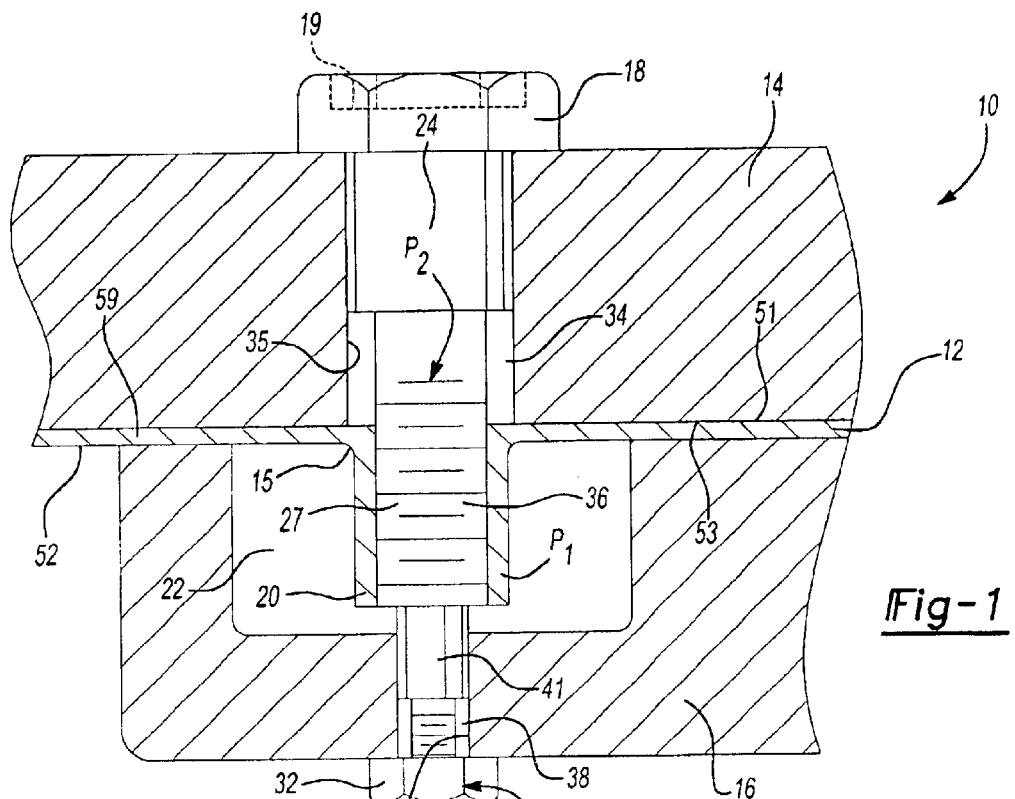
FIG. 1 is a schematic view of an assembly according to the present invention.

With reference to FIG. 1, there is shown an assembly 10 including a first component in the form of a door panel 12, a second component in the form of a window regulator mechanism 14, a third component in the form of a window regulator drive system, in this case a motor 16. A first fixing member in the form of a bolt 18, and a second fixing member in the form of a nut 32 connect the three components.

The door panel 12 can be in the form of a door inner skin, i.e. a pressed component having various holes and attachment features for door components such as door hinges, door latch, audio speakers, and window regulator components.

Alternatively, the door panel 12 can be in the form of a door module, i.e. a panel onto which is pre-mounted various door components. The preassembled door module may then be mounted in a relatively large aperture of a door inner skin.

Alternatively, the door panel 12 can be a panel plate, such as a window regulator mounting plate, onto which parts of a window regulator are mounted.

The window regulator mechanism 14 might typically contain a drum receiving a cable. The drum rotates causing movement of the cable and hence raising or lowering of the window glass via separate components of the window regulator. Note, that the present invention is not restricted to window regulator mechanisms containing drums with cables.

Figure 2:
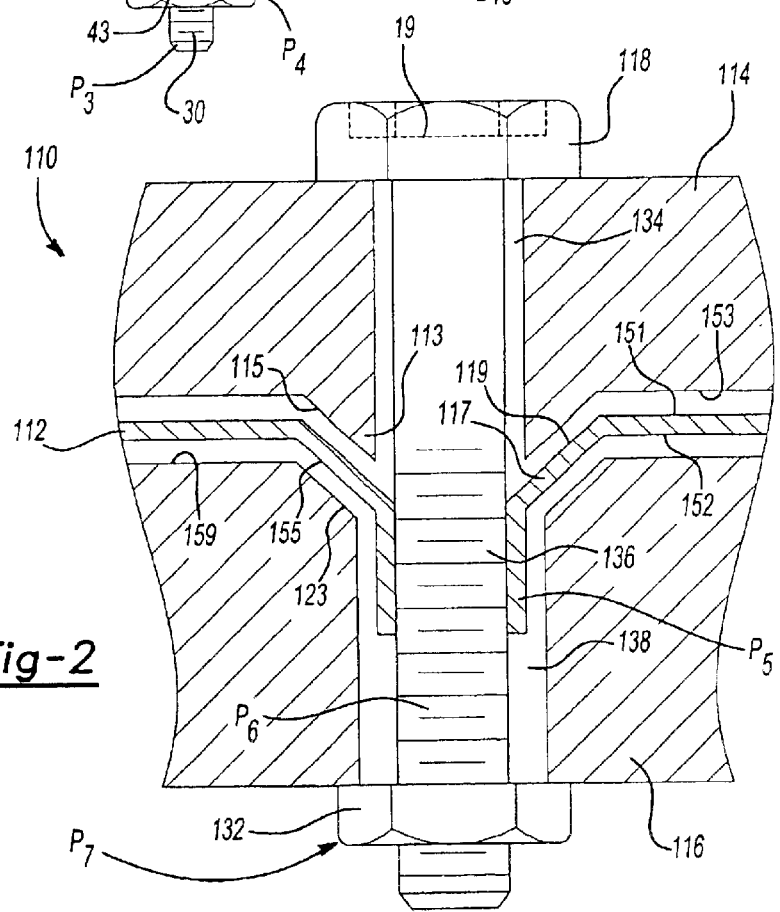
FIG. 2 is a schematic view of an alternative assembly according to the present invention.
Figure 3:
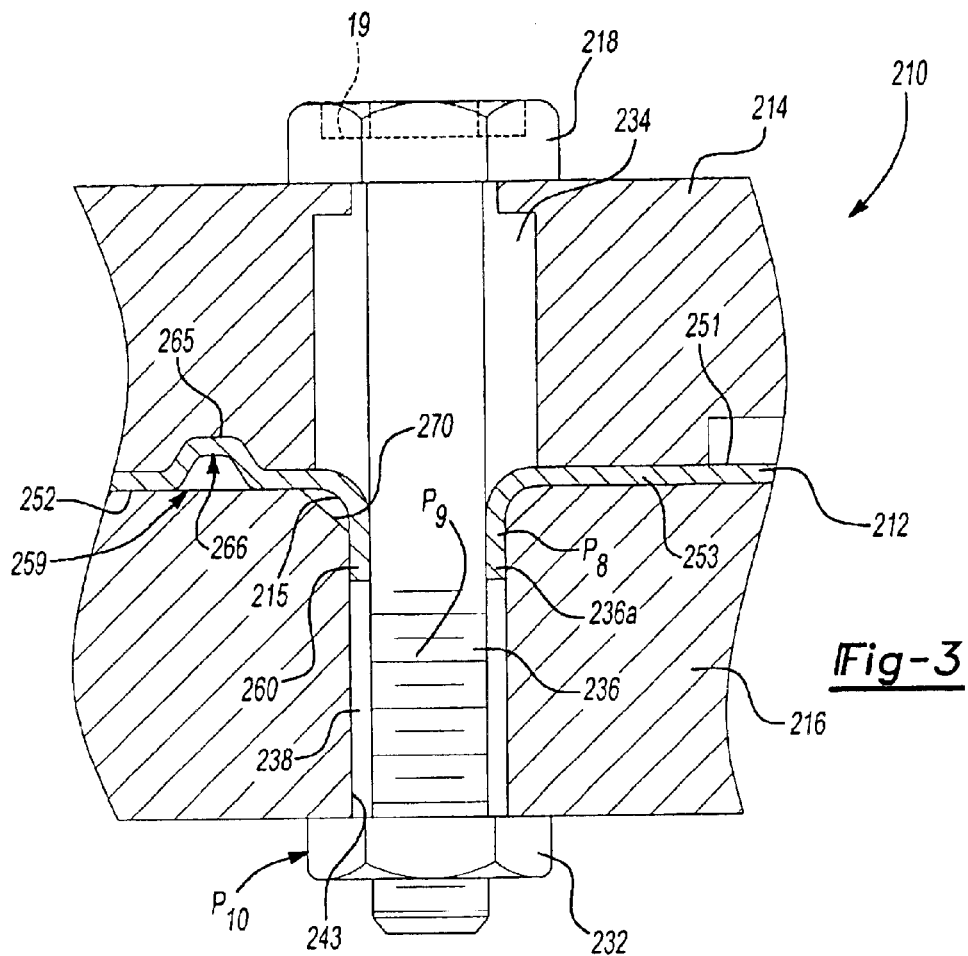
FIG. 3 is a schematic view of an alternative assembly according to the present invention.

In particular it should be noted that the arrangement shown in FIGS. 1, 2 and 3 enables power generated by the window regulator motor 16 to be transferred across the door panel 12 to the window regulator housing to enable raising and lowering of the window. Note that the window regulator motor could be replaced by an alternative drive system, such as a manual window winder.

The door panel 12 includes a first hole 36, which is a threaded hole having a pitch $P_1$. The first hole 36 is a through hole. The door panel 12 has a fillet radius surface 15. The door panel 12 also has a generally planar surface 51 located on one side of the door panel 12 and a generally planar surface 52 located on the opposite side.

The window regulator mechanism 14 includes a second hole 34, which is a through hole. The second hole 34 has a first surface in the form of a wall 35. The window regulator mechanism 14 also has a generally planar surface 53, which faces the door panel 12.

The window regulator motor 16 includes a third hole 38, with a first surface in the form of a wall 43

The window regulator motor 16 includes a recess 22. The window regulator motor 16 also has a generally planar surface 59, which faces the door panel 12.

The bolt 18 has a shank including four portions, a large diameter portion 24, a first threaded portion 27, a small diameter portion 41, and a second threaded portion 30. The first threaded portion 27 has a pitch $P_2$. The second threaded portion 30 has a pitch $P_3$. The nut 32 has a pitch $P_4$. It should be noted that the portions of the first fixing member are designed to be concentric relative to each other.

The bolt 18 is provided with a drive formation in the form of a slot 19. Alternative drive formations such as hexagonal recesses, hexagonal projections, torx formations or other suitable drive formations can be provided.

The assembly 10 can be assembled in the following manner.

The window regulator mechanism 14 is aligned relative to the door panel 12 The bolt 18 is inserted through the second hole 34 of the window regulator mechanism 14, with the large diameter portion 24 of the bolt 18 engaging with the wall 35 of the second hole 34 and the first threaded portion of the bolt 18 engaging with the first threaded hole 36. This provides alignment between the door panel and the window regulator mechanism 14. The bolt 18 is rotated by means of a screwdriver engaging the slot 19 such that the window regulator mechanism 14 is secured to the door panel 12.

The window regulator motor 16 is then positioned on the opposite side of the door panel 12 such that the bolt 18 protrudes through the third hole 38. The recess 22 in the window regulator motor 16 provides clearance around the fillet radius surface 15 such that there is no interference between the fillet radius 15 and the window regulator motor 16 when locating the window regulator motor 16. The small diameter portion 41 of the bolt 18 engages with the wall 43 of the third hole 38 to align the window regulator motor 16 relative to the door panel 12.

Note that the large diameter portion 24 is a relatively snug fit with the second hole 34 and the small diameter portion is a relatively snug fit with the third hole 38, the degrees of fit determining the alignment tolerance between the window regulator motor 16 and the window regulator mechanism 14.

Finally, the nut 32 is screwed onto the second threaded portion of the bolt 18, thus securing the window regulator motor 16 to the door panel 12.

Pitch $P_1$ of the first threaded hole 36 and the pitch $P_2$ of the first threaded portion 27 of the bolt 18 are slightly different such that there is axial interference when the bolt 18 is screwed or unscrewed into the door panel 12 during assembly. The pitch $P_3$ of the second threaded portion 30 and the pitch $P_4$ of the nut 32 are substantially similar such that there is no axial interference when the nut 32 is screwed or unscrewed onto the bolt 18. Thus, less torque is required to screw or unscrew the nut 32 from the bolt 18 than to screw or unscrew the bolt 18 from the door panel 12, Hence, the nut 32 will screw or unscrew without the bolt 18 rotating.

In addition, it should also be noted that since the second threaded portion 30 has a diameter smaller than the first threaded portion 27, less torque is required to screw or unscrew the nut 32 from the bolt 18 than to screw or unscrew the bolt 18 from the door panel 12. This further ensures that the nut 32 will screw or unscrew without the bolt 18 rotating.

Alternatively (where $P_1$ is equal to $P_2$) or additionally (i.e. where $P_1$ is slightly different to $P_2$ as mentioned above), a locking compound could be applied between the first threaded portion 27 of the bolt 18 and the first threaded hole 36 of the door panel 12. Again, less torque is required to screw or unscrew the nut 32 from the bolt 18 (where no locking compound has been applied) than to screw or unscrew the bolt 18 from the door panel 12. Hence, the nut 32 will screw or unscrew without the bolt 18 rotating.

This difference in torque allows the window regulator motor 16 to be replaced by unscrewing the nut 32, removing the window regulator motor 16 from the door panel 12, locating a replacement window regulator motor on the door panel 12 such that the bolt 18 protrudes through the third hole 38 and finally screwing the nut 32 onto the second threaded portion of the bolt 18. Thus, it is relatively easy to replace and secure window regulator motor to the door panel 12.

The fact that the bolt 18 does not rotate during screwing or unscrewing of the nut 32 allows the window regulator motor 16 to be removed and replaced without interfering with the alignment and securing between the window regulator mechanism 14 and the door panel 12. Furthermore, under such circumstances, no access to slot 19 (e.g. to hold bolt 18 stationary) is required.

With reference to FIG. 2, there is shown an assembly 110, including a door panel 112, a window regulator mechanism 114, a window regulator motor 116, a bolt 118, and a nut 132. The door panel 112 includes a first hole 136, which is a threaded hole having a pitch $P_5$. The first hole 136 is a through hole.

Door panel 112 includes a first feature in the form of a depression 117, having an angled frustoconical surface 119, which is contiguous with the first hole 136. Door panel 112 has a second feature, in the form of a projection with an angled frustoconical surface 155. The angled surface 155 is located on the opposite side of the door panel 112 and hence the frustoconical angled surfaces 119 and 155 are aligned relative to each other. Alternatively, the first feature of the door panel could be in the form of a projection and the second feature of the door panel in the form of a depression (see below). Door panel 112 has a generally planar surface 151 located on one side of the door panel 112 and a generally planar surface 152 located on the opposite side.

The window regulator mechanism 114 includes a second hole 134, the second hole being a through hole, and includes a first feature in the form of a projection 113. The projection 113 has an angled frustoconical surface 115 contiguous with the second hole 134. The window regulator mechanism 114 also has a generally planar surface 153, which faces the door panel 122.

The window regulator motor 116 includes a third hole 138 and a depression in the form of a frustoconical chamfered portion 123 being contiguous with the third hole 138.

The window regulator motor 116 has a generally planar surface 159, which faces the window regulator motor 116.

The bolt 118 has a continuous thread of pitch $P_6$. The nut 132 has a pitch $P_7$.

The assembly 110 can be assembled in the following manner.

The window regulator mechanism 114 is first aligned relative to the door panel 112. The bolt 118 is inserted through the second hole 134 of the window regulator mechanism 114, with the frustoconical angled surface 119 of the depression 117 of the door panel 112 engaging with the frustoconical angled surface 115 of the projection 113 of the window regulator mechanism 114. The aligned surfaces 115 and 119 provide alignment between the window regulator mechanism 114 and the door panel 112. The bolt 118 is rotated by means of a screwdriver engaging the slot 19 such that the window regulator mechanism 114 is secured to the door panel 112.

The window regulator motor 116 is located on the opposite side of the door panel 112 such that the bolt 118 protrudes through the third hole 138. The frustoconical chamfered portion 123 engages with the frustoconical angled surface 155 of the door panel 112 to provide alignment between the window regulator motor 116 and the door panel 112. Finally, the nut 132 is screwed onto the bolt 18, thus securing the window regulator motor to the door panel.

A clearance is provided between the generally planar surface 153 of the window regulator mechanism 114 and the generally planar surface 151 of the door panel 112 such that the frustoconical angled surfaces 119 and 115 engage with each other prior to the generally planar surfaces 151 and 153 engaging. This ensures alignment between the door panel 112 and the window regulator mechanism 114.

Similarly, a clearance is provided between the generally planar surface 159 of the window regulator motor 116 and the generally planar surface 152 of the door panel 112 such that the angled surface 155 engages with the frustoconical chamfered portion 123 prior to the generally planar surfaces 159 and 152 engaging. This ensures alignment between the door panel 112 and the window regulator motor 116.

In an alternative embodiment there is no designed clearance between the generally planar surfaces. Hence, both the angled surfaces and the generally planar surfaces engage with each other at the same time to align. In this alternative embodiment, a clearance between the generally planar surfaces could arise from manufacturing tolerances. The window regulator motor and the window regulator mechanism are plastic components and the door panel is a steel pressing, hence any manufacturing tolerance can be overcome by deformation of the plastic components relative to the steel pressing.

Note either of these embodiments allows the use of a standard bolt.

Note that pitch $P_5$ of the first threaded hole 136 and the pitch $P_6$ of the bolt 118 are different such that there is axial interference when the bolt 118 is screwed or unscrewed into the door panel 112 during assembly. The pitch $P_7$ of the nut 132 is substantially similar to the pitch $P_6$ of the bolt 118 such that there is no axial interference when the nut 132 is screwed or unscrewed onto the bolt 118. Thus, less torque is required to screw or unscrew the nut 132 from the bolt 118 than to screw or unscrew the bolt 118 from the door panel 112. Hence, the nut 132 will screw or unscrew without the bolt 118 rotating.

Alternatively, the window regulator mechanism could include a depression, which engages with a projection (first feature) on a door panel, the corresponding door panel depression (second feature) further engaging with a projection on a window regulator drive mechanism (see above).

With reference to FIG. 3 there is shown an assembly 210 including a door panel 212, a window regulator mechanism 214, a window regulator motor 216, a bolt 218, and a nut 232. The door panel 212 includes a first hole 236, defined by a cylindrical wall 236A of door panel 212, which is a threaded through hole having a pitch $P_8$. The wall 236A has a radial external surface 260, which is aligned with the threaded hole 236. The door panel 212 has a fillet radius surface 215, and also includes a first feature in the form of a projection 265. The door panel 212 has a generally planar surface 251 located on one side of the door panel 212 and a generally planar surface 252 located on the opposite side.

The window regulator mechanism 214 includes a second through hole 234. The window regulator mechanism 214 also includes a first feature in the form of a depression 266, which engages with the projection 265 on the door panel 212. The window regulator mechanism 214 has a generally planar surface 253, which faces the door panel 212.

The window regulator motor 216 has a third hole 238 with a wall 243. The window regulator motor 216 has a generally planar surface 259 which faces the door panel 212.

The bolt 218 has a continuous external thread of pitch $P_9$, and nut 132 has a pitch $P_{10}$.

The assembly 210 can be assembled in the following manner.

The window regulator mechanism 214 is aligned relative to the door panel 212. The bolt 218 is inserted through the second hole 234 of the window regulator mechanism 214, with the projection 265 of the door panel 212 engaging with the depression 266 of the window regulator mechanism 214 to provide alignment between the window regulator mechanism 214 and the door panel 212. The bolt 218 can be rotated by means of a screwdriver engaging the slot 19 such that the window regulator mechanism 214 is secured to the door panel 212.

The window regulator motor 216 is located on the opposite side of the door panel 212 such that the bolt 218 protrudes through the third hole 238. The wall 243 of the window regulator motor 216 engages with external surface 260 of the wall 236A to provide alignment between the window regulator motor 216 and the door panel 212.

The window regulator motor 216 has a chamfered edge 270 to prevent interference with the fillet radius surface 215 of the door panel 212 during alignment of the door panel 212 and the window regulator motor 216. Finally, the nut 232 is screwed onto the bolt 213, thus securing the window regulator motor 216 to the door panel 212.

Note this embodiment also allows the use of a standard bolt.

Note that Pitch $P_8$ of the first threaded hole 236 and the pitch $P_9$ of the bolt 218 are different such that there is axial interference when the bolt 218 is screwed or unscrewed into the door panel 212 during assembly. The pitch $P_{10}$ of the nut 232 is substantially similar to the pitch $P_9$ of the bolt 218 such that there is no axial interference when the nut 232 is screwed or unscrewed onto the bolt 128. Thus, less torque is required to screw or unscrew the nut 232 from the bolt 218 than to screw or unscrew the bolt 218 from the door panel 212. Hence, the nut 232 will screw or unscrew without the bolt 218 rotating.

Figure 4:
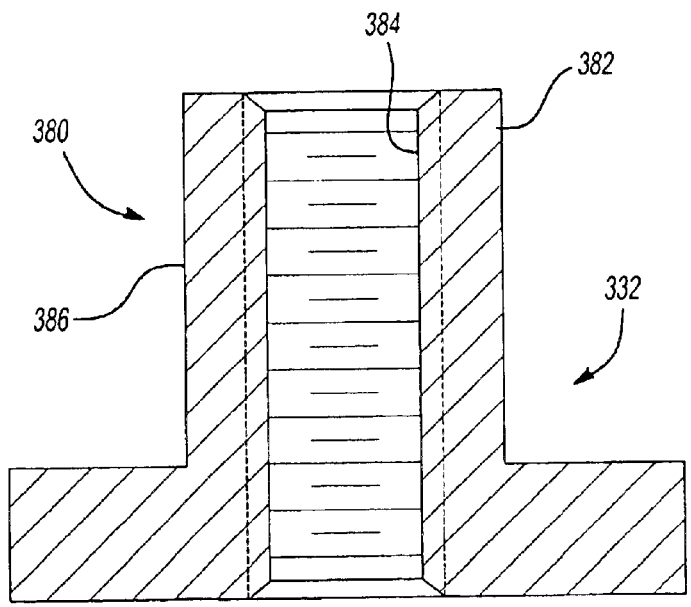
FIG. 4 is a schematic view of a further alternative second fixing member according to the present invention.

With reference to FIG. 4 there is shown an alternative second fixing member in the form of a nut 380, having a sleeve 382 and an internal threaded portion 384. The sleeve has a radial external surface 386, to engages the wall of the third hole of the window regulator motor, and align the window regulator motor relative to the door panel and/or the window regulator mechanism. The threaded portion 384 of the second fixing means engages with the first fixing member to secure the assembly.

This alternative second fixing member could be incorporated into the embodiments of FIGS. 1, 2, and 3.

Note that a seal can be provided between the door panels 12, 112, 212, and the window regulator mechanisms 14, 114, 214 and/or the door panel and the window regulator drive mechanism 16, 116, 216.

The door panel 12, 112, 212 is made from a steel pressing, with the pressing operation partially producing the first hole 36, 136, 236 and an additional operation used to produce the thread of the first hole. It should be noted that in the embodiment of FIG. 2, the depression 117, which is contiguous with the first threaded hole 136, is also formed as a result of the pressing operation used to form the first hole.

The surfaces where the generally planar surface 51, 151, 251 of the door panel engages with the generally planar surface 53, 153, 253 of the window regulator mechanism can be roughened to provide greater friction between said surfaces. Thus, under dynamic loading, the door panel and the window regulator mechanism remain correctly aligned. The roughened surfaces also reduces the force on the features providing alignment between the door panel and the window regulator mechanism.

Similarly, the surface where the generally planar surface 52, 152, 252 of the door panel engages with the generally planar surface 59, 159, 259 of the window regulator motor, can be roughened to provide greater friction between said surfaces. Again under dynamic loading, the door panel and the window regulator motor remain correctly aligned. This roughened surface also reduces the force on the features providing alignment between the door panel and the window regulator motor.

The generally planar surfaces can be roughened by a suitable roughening process, for example, by shot blasting the steel pressing.

Alternatively, the seal applied to the generally planar surfaces will act as an adhesive such that, under dynamic loading, the window regulator motor and the door panel and the door panel and the window regulator mechanism remain correctly aligned.

Maintaining correct alignment between the window regulator motor and the door panel, and between the door panel and the window regulator mechanism, ensures that, significantly, there is correct alignment between the window regulator motor and the window regulator mechanism.

The aforementioned description is exemplary rather than limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An assembly including:
   first, second and third components and first and second fixing members, the first, second and third components having respective first, second and third holes, the first hole being a threaded hole, in which the first fixing member extends through the second hole and a first threaded portion of the first fixing member engaging the first hole to secure the first component to the second component, at least one of the fixing members extending through the third hole with the first fixing member engaging the second fixing member to secure the third component to the first component, and the first component being situated between the second and third component wherein the first component is a door panel, the second component is a window regulator mechanism and the third component is a window regulator drive system.

2. The assembly according to claim 1 in which a first feature on the first component engages a first feature on the second component to align the first component relative to the second component.

3. The assembly according to claim 2 in which the first feature of at least one of the components is a recess.

4. The assembly according to claim 2 in which the first feature of at least one of the components is a projection.

5. The assembly according to claim 2 in which at least one of the first feature of the first component and the first feature of the second component is contiguous with at least one of the holes.

6. The assembly according to claim 5 in which the first feature of the first component is at least one of a recess and a projection and the second feature of the first component is at least one of a recess and projection.

7. The assembly according to claim 2 in which a first feature on the third component engages a second feature of the first component to align the first component relative to the third component and the first and second features of the first component are on opposite sides of the first component and are aligned.

8. The assembly according to claim 1 in which the second component has a first surface for engagement with the first fixing member to align the second component relative to the first component.

9. The assembly according to claim 1 in which a first feature on the third component engages a second feature of the first component to align the first component relative to the third component.

10. The assembly according to claim 9 in which at least one of the first feature of the third component and the second feature of the first component is a recess.

11. The assembly according to claim 9 in which at least one of the first feature of the third component and the second feature of the first component is a projection.

12. The assembly according to claim 9 in which at least one of the first feature of the third component and the second feature of the first component is contiguous with at least one of the holes.

13. The assembly according to claim 12 in which the first component is made from metal, with the first hole being at least partially formed by a pressing operation and with the first and second features being at least partially formed by a pressing operation.

14. The assembly according to claim 1 in which the third component has a first surface for engagement with at least one of the first and second fixing members to align the third component relative to at least one of the first and second components.

15. The assembly according to claim 1 in which the first component is sealed relative to the second component and the first component is sealed relative to the third component.

16. The assembly according to claim 1 designed such that forces acting on the first fixing member prevents rotation of the first fixing member relative to the first component during securing and releasing of the third component by the second fixing member.

17. The assembly according to claim 1 wherein the first hole is pre-threaded.

18. The assembly according to claim 1 wherein the door panel is a door module.

19. An assembly including:
   first, second and third components and first and second fixing members, the first, second and third components having respective first, second and third holes, the first hole being a threaded hole, in which the first fixing member extends through the second hole and a first threaded portion of the first fixing member engaging the first hole to secure the first component to the second component, at least one of the fixing members extending through the third hole with the first fixing member engaging the second fixing member to secure the third component to the first component, and the first component being situated between the second and third component wherein the first threaded portion has a diameter which is greater than the diameter of a second threaded portion.

20. An assembly including:
   first, second and third components and first and second fixing members, the first, second and third components having respective first, second and third holes, the first hole being a threaded hole in which the first fixing member extends through the second hole and a first threaded portion of the first fixing members engaging the first hole to secure the first component to the second component, at least one of the fixing members extending through the third hole with a second threaded portion of the first fixing member engaging the second fixing member to secure the third component to the first component, and the first component being situated between the second and third component, wherein the first threaded portion has a pitch which is different from the pitch of the first hole, and the second threaded portion has a pitch which is substantially equal to the pitch of the second fixing member.

21. A method of assembly of a door assembly comprising the steps of;

providing first, second and third components and first and second fixing members, the first, second and third components having respective first, second and third holes, the first hole being a threaded hole;

assembling the first and second components and first fixing member to form a subassembly such that the first fixing member extends through the second hole and a first threaded portion of the first fixing member engages the first hole to secure the first component to the second component;

then assembling the third component to the subassembly; and then mounting the second fixing member on the first fixing member with the first fixing member engaging the second fixing member to secure the third component to the first component to form an assembly such that at least one of the fixing members extends through the third hole in which the first component is situated between the second and third component wherein the first component is a door panel, the second component is a window regulator mechanism and the third component is a window regulator drive system.

22. A method of maintaining an assembly comprising the steps of:

providing first, second and third components and first and second fixing members, the first, second and third components having respective first, second and third holes, the first hole being threaded, in which the first fixing member extends through the second hole and a first threaded portion of the first fixing member engaging the first hole to secure the first component to the second component, at least one of the fixing members extending through the third hole, and with the first fixing member engaging the second fixing member to secure the third component to the first component, and the first component being situated between the second and third component;

removing the second fixing member;

removing the third component;

replacing the third component; and replacing the second fixing member wherein the first component is a door panel, the second component is a window regulator mechanism and the third component is a window regulator drive system.

* * * * *